US010099263B2

(12) United States Patent
Cagnasso et al.

(10) Patent No.: US 10,099,263 B2
(45) Date of Patent: Oct. 16, 2018

(54) WASHING AND DRYING MACHINE (71) Applicant: INDESIT COMPANY S.P.A., Fabriano (IT)

(72) Inventors: Andrea Cagnasso, Moncalieri (IT); Mario Lippera, Cerreto D'Esi (IT); Gianluca Benedetto, La Maddalena (IT); Luca Brazzarola, Cordenons (IT); Diego Driussi, Porcia (IT); Ivan Murador, Fontanafredda (IT)

(73) Assignee: Indesit Company, S.P.A., Fabriano (IT)

( * ) Notice: Subject to any disclaimer, the term of this patent is extended or adjusted under 35 U.S.C. 154(b) by 55 days.

(21) Appl. No.: 15/302,736

(22) PCT Filed: Apr. 2, 2015

(86) PCT No.: PCT/IB2015/052423
§ 371 (c)(1),
(2) Date: Oct. 7, 2016

(87) PCT Pub. No.: WO2015/155643
PCT Pub. Date: Oct. 15, 2015

(65) Prior Publication Data
US 2017/0028447 A1 Feb. 2, 2017

(30) Foreign Application Priority Data

Apr. 7, 2014 (IT) .............................. TO2014A0287

(51) Int. Cl.
*B08B 3/04* (2006.01)
*A47L 15/00* (2006.01)
(Continued)

(52) U.S. Cl.
CPC ............ *B08B 3/04* (2013.01); *A47L 15/0028* (2013.01); *A47L 15/4291* (2013.01);
(Continued)

(58) Field of Classification Search
None
See application file for complete search history.

(56) References Cited

U.S. PATENT DOCUMENTS 3,986,345 A * 10/1976 Pilz ..................... A47L 15/4291
62/238.6
4,603,489 A * 8/1986 Goldberg ................ D06F 58/02
34/605
2007/0261721 A1 11/2007 Eiermann et al.

FOREIGN PATENT DOCUMENTS

EP 2064982 A1 6/2009
EP 2193741 A2 6/2010
EP 2662013 A1 11/2013

OTHER PUBLICATIONS

International Search Report and Written Opinion for Counterpart PCT/IB2015/052423, dated Oct. 15, 2015.

* cited by examiner

*Primary Examiner* — Rita P Adhlakha
(74) *Attorney, Agent, or Firm* — McGarry Bair PC (57) ABSTRACT

A washing and drying machine has a treatment tub and comprises: a washing circuit, for drawing liquid from the tub and conveying it back into the tub, having a pump and means for heating the liquid; a drying circuit for extracting air from the tub and conveying it back into the tub, having a first fan, means for dehumidifying the air, and means for heating the dehumidified air; and a heat-pump arrangement having a refrigerating circuit for a refrigerant fluid, which includes a first condenser, a first evaporator, a first lamination valve, and a compressor. The means for heating the liquid comprise the first condenser, and the refrigerating circuit further comprises a second condenser, in series to the first condenser, and a second evaporator. The means for dehumidifying the air comprise the second evaporator, and the means (Continued)

for heating the dehumidified air comprise the second condenser.

17 Claims, 6 Drawing Sheets (51) Int. Cl.
    *A47L 15/42*      (2006.01)
    *A47L 15/48*      (2006.01)
    *D06F 39/00*      (2006.01)
    *D06F 58/20*      (2006.01)
    *D06F 58/28*      (2006.01)
    *D06F 25/00*      (2006.01)
    *D06F 33/02*      (2006.01)

(52) U.S. Cl.
    CPC ............ *A47L 15/483* (2013.01); *D06F 25/00* (2013.01); *D06F 33/02* (2013.01); *D06F 39/006* (2013.01); *D06F 58/206* (2013.01); *D06F 58/28* (2013.01); *A47L 2501/03* (2013.01); *A47L 2501/06* (2013.01); *A47L 2501/12* (2013.01); *D06F 2058/287* (2013.01); *D06F 2058/2864* (2013.01); *D06F 2204/04* (2013.01); *D06F 2204/082* (2013.01); *D06F 2204/086* (2013.01); *Y02B 30/52* (2013.01); *Y02B 40/44* (2013.01)

WASHING AND DRYING MACHINE

CROSS-REFERENCE TO RELATED APPLICATIONS

This application claims priority to International Application No. PCT/IB2015/052423, filed Apr. 2, 2015, with claims priority to Italian Application No. TO2014A000287, filed Apr. 7, 2014.

FIELD OF THE INVENTION

The present invention relates to household machines for treatment of articles that are to be washed and subsequently dried. A preferred application of the invention is to dishwasher machines, but the principles of the invention may be equally applied to machines for washing and drying laundry.

PRIOR ART

In the current state of the art, there is known the use of heat pumps on machines for treatment of laundry or dishes. Heat pumps are typically used on machines designed for drying laundry (washer-dryers and dryers) or else on dishwasher machines, for heating a treatment fluid represented by drying air or else by washing or rinsing water, respectively.

Heat-pump machines envisage two substantially closed circuits: the first circuit is the circuit for the treatment fluid, i.e., the drying air or else the washing or rinsing water, whereas the second circuit is the circuit for the refrigerant fluid, which passes into a compressor set between an evaporator and a condenser. In operation, the temperature of the refrigerant fluid increases following upon compression by the compressor. The refrigerant fluid is then made to pass into a condenser where it yields heat to the flow of air or water, which is thus heated. From the condenser, the refrigerant fluid passes first into a lamination valve, constituted, for example, by a simple capillary tube, which expands and cools the fluid, and next into the evaporator, and then returns back into the compressor. The condenser of the heat pump hence performs the same function of heating air or water that, in machines for treatment of laundry or in more traditional dish-washer machines, is performed by an electrical heater.

SUMMARY OF THE INVENTION

The object of the present invention is basically to provide a machine designed to carry out operations of washing and drying in which heating of a washing and/or rinsing liquid and dehumidification and heating of drying air are obtained by a heat-pump arrangement that is simple, inexpensive, and compact.

The above object is achieved, according to the present invention, by a washing and drying machine and by a method for controlling operation of a washing and drying machine which have the characteristics referred to in the annexed claims. The claims form an integral part of the technical teaching provided in relation to the invention.

BRIEF DESCRIPTION OF THE DRAWINGS

Further objects, characteristics, and advantages of the invention will emerge clearly from the ensuing detailed description, with reference to the annexed drawings, which are provided purely by way of explanatory and non-limiting example and in which.

DESCRIPTION OF EMBODIMENTS OF THE INVENTION

Reference to "an embodiment" or "one embodiment" in the framework of present description is intended to indicate that a particular configuration, structure, or characteristic described in relation to the embodiment is comprised in at least one embodiment. Hence, phrases such as "in an embodiment" or "in one embodiment" and the like that may be present in various points of this description do not necessarily all refer to one and the same embodiment. Furthermore, the particular configurations, structures, or characteristics may be combined in any adequate way in one or more embodiments. The references used in what follows are provided merely for convenience and do not define the sphere of protection or the scope of the embodiments.

It is pointed out that in the sequel of the present description only the elements useful for an understanding of the invention will be described in particular detail, taking for granted that the machine forming the subject of the invention comprises all the other elements in themselves known for normal operation of a commonly used machine designed to carry out washing and drying operations.

Figure 1:
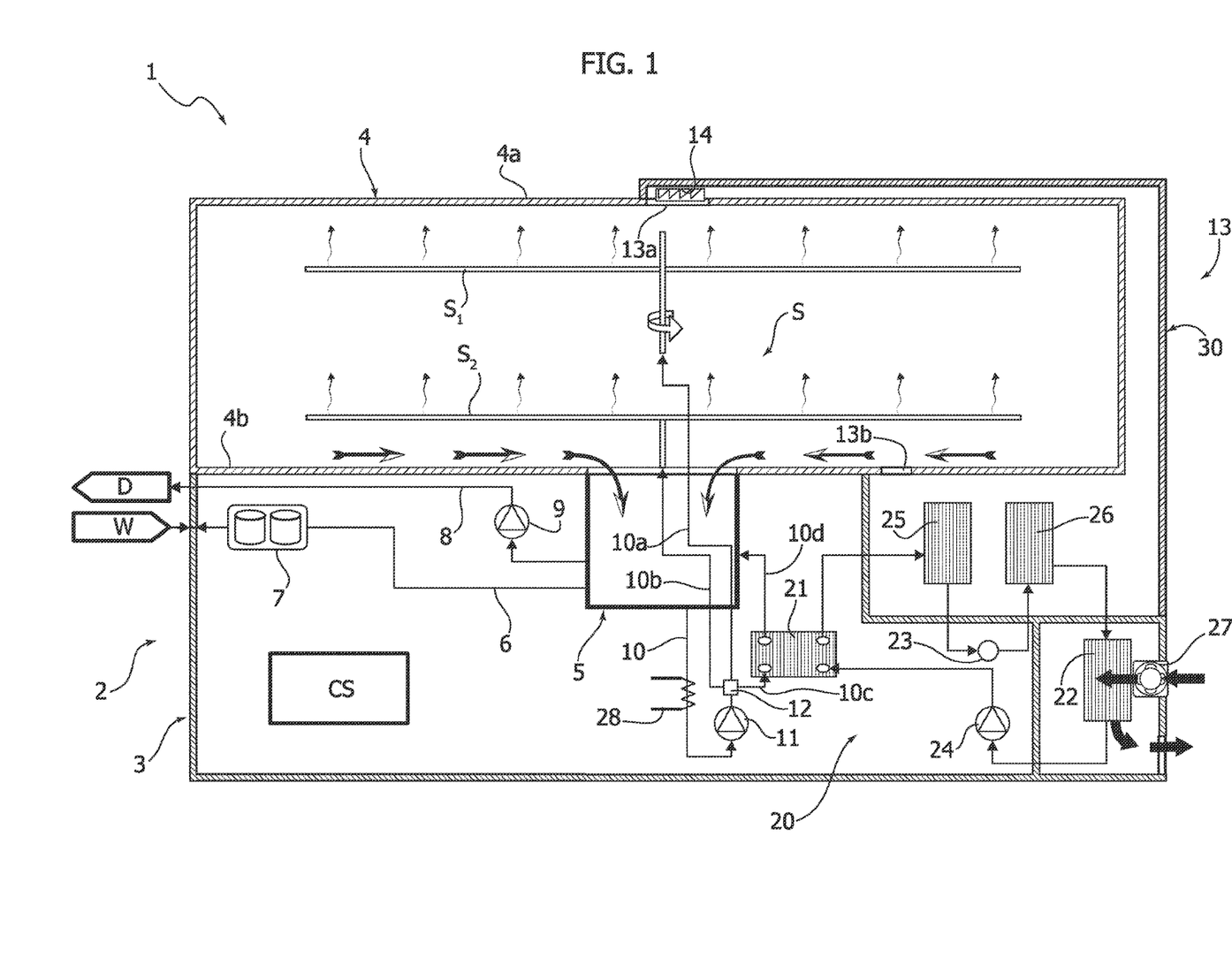
FIGS. 1 and 2 are schematic representations of a washing and drying machine according to one embodiment of the invention in two different operating conditions.

Designated as a whole by 1 in FIG. 1 is a washing and drying machine according to one embodiment of the present invention, here represented by a dish-washing machine.

The machine 1 has a load-bearing structure 2, which includes a base 3, supported on which is a treatment tub 4 for containing articles that are to be washed and dried, in the specific example dishes. The tub 4 is of a conception that is as a whole known and comprises for this purpose a plurality of vertical side walls, an upper wall 4a, and a bottom wall 4b. One of the aforesaid vertical side walls is constituted by an inner shell of the loading door of the dish-washer machine (not represented).

The tub 4 has a collection sump 5 having an inlet mouth at the wall 4b. The function of the lower sump 5 is precisely that of gathering the washing or rinsing water that reaches the bottom wall 4b of the tub 4, which preferentially has a shape that is at least slightly flared towards the aforesaid mouth of the sump 5. The sump 5, which projects at the bottom in the base 3, has an inlet that is in fluid communication with a duct 6 for supply of water from an external mains water system W, to which the machine 1 is connected. Operative on the duct 6 are a known electric intake valve (not represented) and a water-softener device 7 of a conception in itself known, for example an ion-exchange resin decalcifier.

The sump 5 has an outlet that is in fluid communication with a duct 8, for connection to an external sewage system D, operative on which is a discharge pump 9. A further outlet of the sump 5 is instead connected to a duct 10, operative along on which is a washing pump 11, designed to supply a sprinkling system S operative within the tub 4. In the example illustrated, the sprinkling system S comprises an upper sprinkler $S_1$ and a lower sprinkler $S_2$, which are preferably rotary sprinklers.

In a preferred embodiment of the invention, provided along the duct 10, downstream of the pump 11, are valve means, used for supplying selectively the sprinkler members $S_1$ and $S_2$, for example for carrying out treatment programs on of a small load or for carrying out alternate washing or rinsing steps, i.e., steps carried out by supplying just one sprinkler, or else both sprinklers, or again by supplying the two sprinklers alternately.

Figure 3:
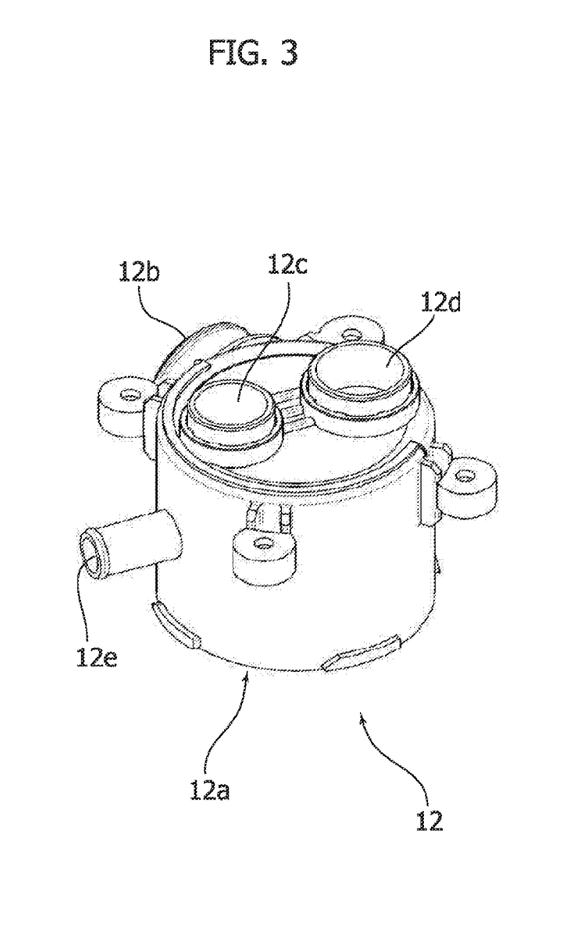
FIG. 3 is a schematic perspective view of a switchable device forming part of a washing circuit of a machine according to one embodiment of the invention.

In the example illustrated, the aforesaid valve means comprise a switchable valve device, designated as a whole by 12 in FIG. 3, and hereinafter defined for simplicity as "diverter". The diverter 12, as similar devices according to the known technique, has a housing 12a provided with an inlet 12b, for connection of the duct 10 to the delivery side of the pump 11, and two main outlets 12c and 12d, connected to ducts 12a and 12b for supply of the sprinkler $S_1$ and of the sprinkler $S_2$, respectively. It should be noted that, in the case of dish-washer machines equipped with a further sprinkler (for example, a shower-like sprinkler set in a position corresponding to the upper wall 4a of the tub), the diverter 12 may comprise a further outlet for supply of the aforesaid further sprinkler.

Displaceably mounted within the housing 12a is an open/close member or distributor, which can be operated by a corresponding actuator isolated with respect to the fluid, for assuming a plurality of positions, amongst which at least one first position, for opening both of the outlets 12c and 12d, and at least one second position, for opening the outlet 12d and closing the outlet 12c, and/or vice versa, according to known technique. For instance, the aforesaid distributor member may have the shape of a disk or of a circular sector, with one or more through holes, and be displaceably mounted in front of the aforesaid outlets 12c and 12d.

The machine 1 comprises a heat-pump arrangement, which is designated as a whole by 20 and is defined hereinafter, for simplicity, as "heat pump", and which, in a preferred embodiment, is housed in the base 3 of the machine.

The heat pump 20 has a closed thermodynamic circuit, hereinafter defined for simplicity as "refrigerating circuit", for a working fluid, hereinafter defined for simplicity as "refrigerant", this circuit including a condenser 21, an evaporator 22, a lamination valve 23, and a compressor 24, all this according to a technique in itself known in the sector of heat pumps. The lamination valve 23 may be constituted by a simple capillary tube, whilst the condenser 21 is preferably constituted by a plate-type heat exchanger. The condenser 21 belongs to the means for heating the washing or rinsing liquid: for this purpose, the heat exchanger that forms the condenser 21 has a hot side and a cold side, flowing in which are, respectively, the refrigerant of the heat pump 20 and the washing or rinsing liquid, where the cold side of the aforesaid heat exchanger is connected in fluid communication with the delivery line of the washing pump 11, in particular by way of the diverter 12.

Preferentially, the cold side of the condenser 21 is supplied by tapping, i.e., with just part of the liquid to be heated forced by the pump 11, another part supplying the sprinkler $S_1$ and/or the sprinkler $S_2$, according to the operating condition of the diverter 12.

According to a preferred embodiment, the device 12 is configured in such a way that its housing 12a additionally defines a further outlet, designated by 12e, which is always in pressure, irrespective of the operating position of the distributor member of the diverter 12. Connected to the above outlet 12e, which preferentially has a section of passage smaller than the outlets 12c and 12d, is the first end of a duct or tube 10c, the second end of which is connected to the inlet of the cold side of the condenser 21. The outlet of the cold side of the condenser 21 is then connected, via a corresponding duct 10d, to an inlet of the sump 5.

In a particularly advantageous embodiment, provided along the duct 10c are further valve means (not represented) of any known conception, for example a valve of an open/closed type, preferably of a normally closed type, which can be controlled by the control system CS independently of the diverter 12.

In the embodiment exemplified, the sump 5, the ducts 10, 10a, 10b, 10c, 10d, the pump 11, the diverter 12, and the sprinkling system S form, together with the tub 4, a substantially closed washing circuit for drawing in the washing or rinsing water from the tub and subsequently conveying it back therein. In the course of a washing or rinsing step, in fact, the water is taken in from the mains water supply W, via the duct 6, after prior opening of the corresponding intake valve. The water, decalcified via the water-softener device 7, reaches the sump 5 and is dosed, with modalities in themselves known, for example via a pressure-switch system or with a turbine meter. The water present in the sump 5 is drawn in via the pump 11, and a first part thereof is forced along the duct 10a and/or the duct 10b, via the diverter 12, for supplying the system S, the sprinklers S1, S2 of which spray the water on the dishes contained in the tub 4, supported by racks (not represented). A second part of the water forced by the pump 11 passes, instead, into the cold side of the condenser 21, via the diverter 12 and the duct 10c, to return into the sump 5 via the duct 10d. After striking the dishes, also the water sprayed by the sprinklers S1, S2 drops back onto the bottom 4b of the tub 4 and then returns into the sump 5. From the sump 5 the water is again drawn in by the pump 11 and sent back into circulation. As will emerge clearly hereinafter, the aforesaid washing circuit is provided with means for heating the washing liquid, which are rendered active for the purposes of carrying out hot-washing or hot-rinsing steps.

The machine 1 further comprises a drying circuit, for forced extraction of air from the tub 4 and its re-introduction therein. The drying circuit comprises a channel, only represented schematically in FIG. 1, where it is designated by 13, operative along which is a fan 14, which is designed to draw air from the inside of the tub 4. Preferentially, but not necessarily, the fan 14 is mounted substantially at an opening 13a for outlet of the air from the tub. In a preferred, but non-exclusive, embodiment, this opening 13a is defined in the upper wall 4a of the tub 4. The channel 13 has an inlet, in fluid communication with the aforesaid opening 13a, as well as an outlet at an opening 13b for inlet of air into the tub 4. The opening 13b is preferably in a position corresponding to the bottom wall 4b but, according to possible variant embodiments (not represented), the opening is defined in a side wall of the tub 4. In one embodiment, part of the channel 13 is defined within the base 3.

As will emerge clearly hereinafter, the drying circuit of the machine 1 comprises means for dehumidifying the air extracted from the tub 4 via the fan 14, as well as means for heating the dehumidified air before its re-introduction into the tub 4.

The machine 1 then includes a control system, represented schematically by the block CS, which includes a control unit and is pre-arranged for controlling execution of a plurality of treatment cycles that can be carried out by the machine 1. The control system CS hence manages the various functions that can be carried out by the machine, controlling the corresponding electrical loads, amongst which the ones belonging to the heat pump 20.

According to the invention, the refrigerating circuit of the heat pump 20 further comprises a second condenser 25 that is set in series to the condenser 21, this connection in series regarding the refrigerant circuit. Once again according to the invention, the refrigerating circuit of the heat pump 20 comprises a second evaporator 26. As will emerge clearly hereinafter, the evaporator 26 belongs to the aforesaid means for dehumidifying the air extracted from the tub 4, whereas the condenser 25 belongs to the means for heating the dehumidified air to be conveyed back into the tub 4.

Figure 2:
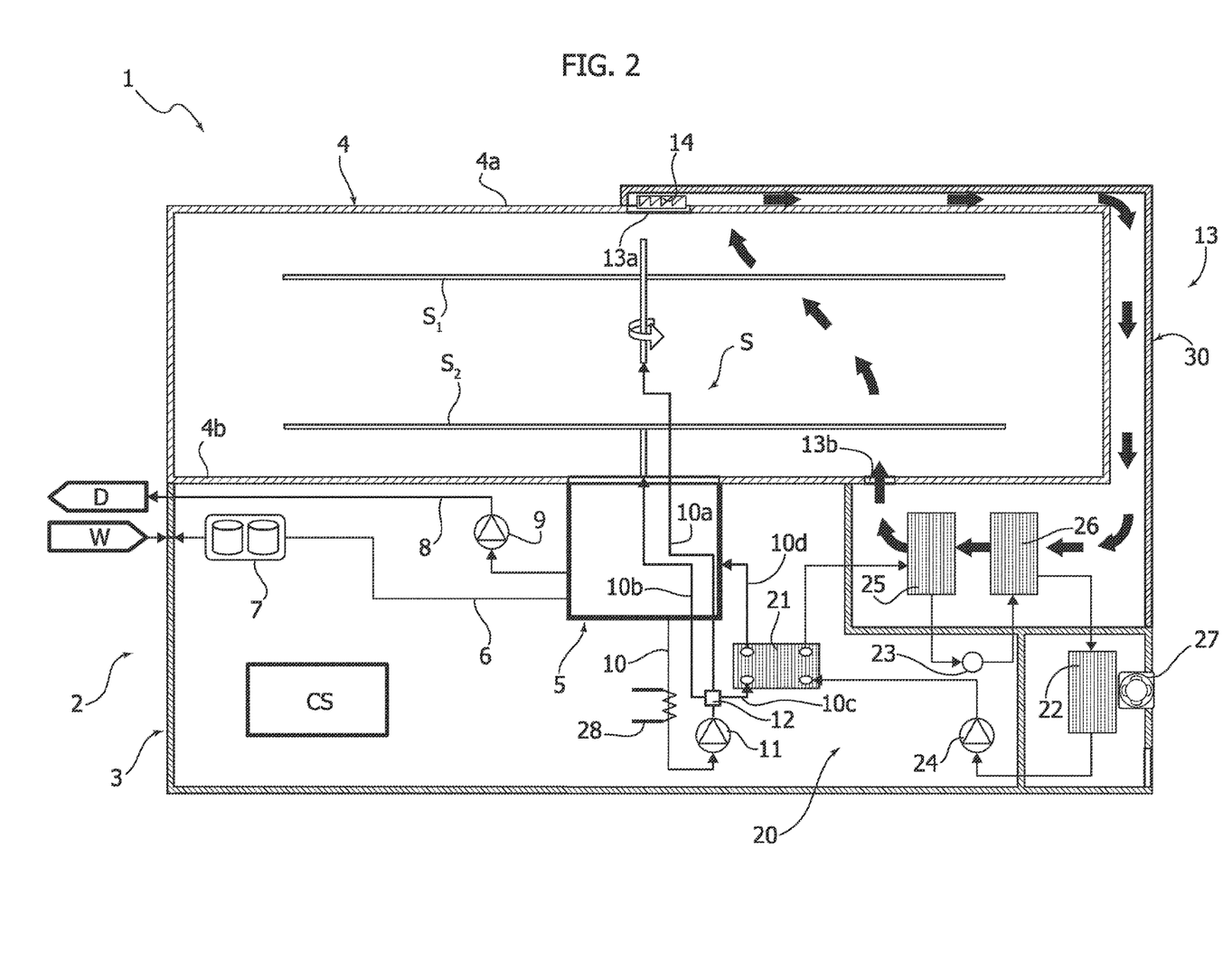

In the embodiment illustrated in FIGS. 1 and 2, the evaporator 26 is set in series to the evaporator 22, upstream of the latter; i.e., it is set in the refrigerating circuit between the condenser 25 and the evaporator 22. Once again with reference to this configuration, the lamination valve 23 is operatively connected in the refrigerating circuit between the condenser 25 and the evaporator 26, whilst the compressor 24 is connected in the refrigerating circuit between the evaporator 22 and the condenser 21.

In a preferred embodiment of the invention a second fan 27 is provided, belonging to the heat pump 20, which is pre-arranged for forcing a flow of air through the cold side the evaporator 22 in such a way that the refrigerant absorbs heat from the air before the refrigerant enters the compressor 24. The air forced by the fan 27 is air at room temperature, preferably taken in from and expelled at the base 3.

FIG. 1 illustrates a condition of operation that arises in the course of a hot-washing step or hot-rinsing step of a treatment cycle carried out by the machine 1. In one of these treatment steps, after or during intake of the water from the mains water supply Wand with the washing pump 11 active, the control system CS keeps the fan 14 belonging to the drying circuit inactive and the heat pump active, in particular the fan 27 and the compressor 24. The refrigerant in the gaseous state and at low pressure, coming from the evaporator 26, is brought up to high pressure by the compressor 24, absorbing a certain amount of heat. The refrigerant then passes through the hot side of the heat exchanger that forms the condenser 21, passing from the gaseous state to the liquid state, thereby transferring heat to the part of water that passes into the cold side of the same heat exchanger. This part of water, as has been said, reaches the cold side of the condenser 21 via the diverter 12 and the duct 10c, and then returns, heated, into the sump 5 via the duct 10d.

The refrigerant in the liquid state at outlet from the condenser 21 then passes through the heat exchanger that forms the condenser 25. Given that in the washing or rinsing step the drying circuit is inactive, no flow of forced air passes through the condenser 25 and the evaporator 26: the temperature of the refrigerant is hence not significantly lowered in the course of its passage through the condenser 25. At outlet from the condenser 25, the refrigerant in the liquid state passes into the capillary tube that constitutes the lamination valve 23: the refrigerant expands and cools up, partially converting into vapour (a prevalently liquid liquid-gas mixture), and then passes through the cold side of the heat exchanger that forms the evaporator 22. In the evaporator 22, the refrigerant absorbs heat from the ambient air forced by the fan 27, evaporating completely. The refrigerant now in the gaseous state and at low pressure then returns to the compressor 24, where it is again compressed and thereby heated, and then returns into circulation towards the condenser 21. This operating cycle is repeated for all the time necessary to guarantee that a defined temperature for heating the washing or rinsing water is reached and/or maintained, in the condition where the washing pump 11 is active continuously or intermittently.

In the course of a hot-washing or hot-rinsing step, as has been seen, part of the water is drawn from the sump 5, via the pump 11, and then conveyed to the sprinkling system S without passing through the condenser 21. Continuous recirculation of a part of the water through the condenser 21, in the ways described above, in any case enables the entire volume of washing water drawn into the tub to be brought to the predefined washing or rinsing temperature. Of course, when a purposely provided valve on the duct 10c is operative, this is kept in an open condition by the control system CS in the course of the steps of heating of the water.

At the end of the hot-washing or hot-rinsing step, or even before its end, operation of the heat pump 20, and especially of its compressor 24 and fan 27, can be stopped.

After the end of the hot-washing or hot-rinsing step, the control system CS issues a command for activation of the discharge pump 9. Via the corresponding duct 8, the water can be evacuated from the machine 1. In variant embodiments, it is also possible to convey the water used for a rinsing step towards a storage tank of the machine, not represented, instead of towards the sewage system D. This water that has accumulated inside the machine 1 can be used in a step of a subsequent washing cycle, for example an initial washing step of a subsequent operating cycle of the machine.

FIG. 2 illustrates the typical condition of operation of the heat pump 20 in the course of a step of drying of the dishes. In the course of the drying step, the control system CS keeps the washing pump 11 and the fan 27 inactive. The control system CS issues a command, instead, for activation of the fan 14 and of the compressor 24 of the heat pump 20. As may be seen, the fan 14 draws in air from the corresponding outlet opening provided in the tub 4, here in the upper wall 4a of the tub. Via the channel 13, the humid air extracted from the tub 4 reaches the base 3 and passes through the hot side of the heat exchanger that forms the evaporator 26 and then through the cold side of the heat exchanger that forms the condenser 25, and then returns into the tub through the corresponding opening 13b. In this operating mode, the refrigerant in the gaseous state is compressed by the compressor 24, thereby absorbing heat. The refrigerant traverses the corresponding side of the heat exchanger that forms the condenser 21. In this step, since the washing pump 11 is not active, no heat exchange occurs between the refrigerant and the washing or rinsing water. The refrigerant in the gaseous state, which is still hot at outlet from the condenser 21, then passes into the hot side of the condenser 25, yielding heat and starting its transition into the liquid state. In the capillary tube that constitutes the lamination valve 23, the refrigerant expands, converting partially into vapour and cooling, and then passes into the cold side of the heat exchanger that forms the evaporator 26.

In this step, the humid air extracted from the tub 4 passes first through the hot side of the evaporator 26. In this way, given that the refrigerant within the evaporator 26 has been cooled by means of the lamination valve 23, in the evaporator 26 condensation of the humidity present in the air extracted from the tub 4 is achieved. In the evaporator 26, the refrigerant absorbs heat from the air forced by the fan 14 and passes completely into the gaseous state. Advantageously, the condensation water that is created in this way can be collected in a corresponding tray present in the base 3, underneath the evaporator 26. This tray (not represented) may be in fluid communication with the sump 5, for example via a corresponding small pump or a valve that can be controlled by the control system Cs.

The air dehumidified by the evaporator 26 then passes through the cold side of the heat exchanger that forms the condenser 25. In the condenser 25 the refrigerant fluid is still hot and hence yields heat to the dehumidified air, heating it before its re-introduction into the tub 4 through the opening 13*b*. The refrigerant, which is already in the gaseous state, then passes from the evaporator 26 to the evaporator 22. Given that the refrigerant is already at low pressure and in the gaseous state at outlet from the evaporator 26, in this operating mode no further heat exchange with the flow of air generated by the fan 27 is necessary, the fan being for this reason inactive in the course of the drying steps.

It will be appreciated that, during operation of the fan 14 and of the heat pump 20 in the drying mode described here, there is a circulation of air through the tub 4, where at each passage the humid air extracted from the tub first undergoes dehumidification in the evaporator 26 and then is heated in the condenser 25. At the end of the drying step, operation of the fan 14 and of the compressor 24 is interrupted.

In a preferred embodiment, the washing circuit further comprises an auxiliary electrical heater, designated by 28 in FIGS. 1 and 2. This heater 28 can be integrated in the sump 5 or else directly in the washing pump 11. When envisaged, the heater 28 is activated by the control system CS only for a short interval of time at the start of the hot-washing step or hot-rinsing step in order to enable the water to reach its normal working temperature faster.

It should also be pointed out that, in embodiments in which operative on the duct 10*c* is a purposely provided valve, this is kept in a closed condition by the control system CS in the course of the steps of washing and/or rinsing carried out using cold water, i.e., without any passage of a part of the water through the condenser 21. In general terms, then, the aforesaid valve can be kept in the closed condition when it is not necessary to heat the water.

As has been mentioned, preferentially the condenser 21 is a plate-type heat exchanger, in the hot and cold sides of which there circulate, respectively, the refrigerant and the washing or rinsing liquid that is to be heated. Of course, the sump 5 is provided with a customary filtering system, which in particular includes a plurality of filters having meshes of different sections, in such a way that the liquid passing through the cold side of the heat exchanger that forms the condenser 21 is in any case a liquid substantially without impurities.

Once again by way of preferential example of embodiment, the condenser 25 is a finned-pack heat exchanger. Preferentially, also the evaporator 22 and/or the evaporator 26 are constituted by finned-pack heat exchangers. Very preferably, the condenser 25 comprises two finned-pack heat exchangers, the hot sides of which are connected in series together and the cold sides of which (i.e., the respective finned packs) are arranged parallel and facing one another. This arrangement enables an increase in the capacity of heat exchange between the hot refrigerant fluid and the dehumidified air that is to be heated before total re-introduction thereof into the tub.

Figure 4:
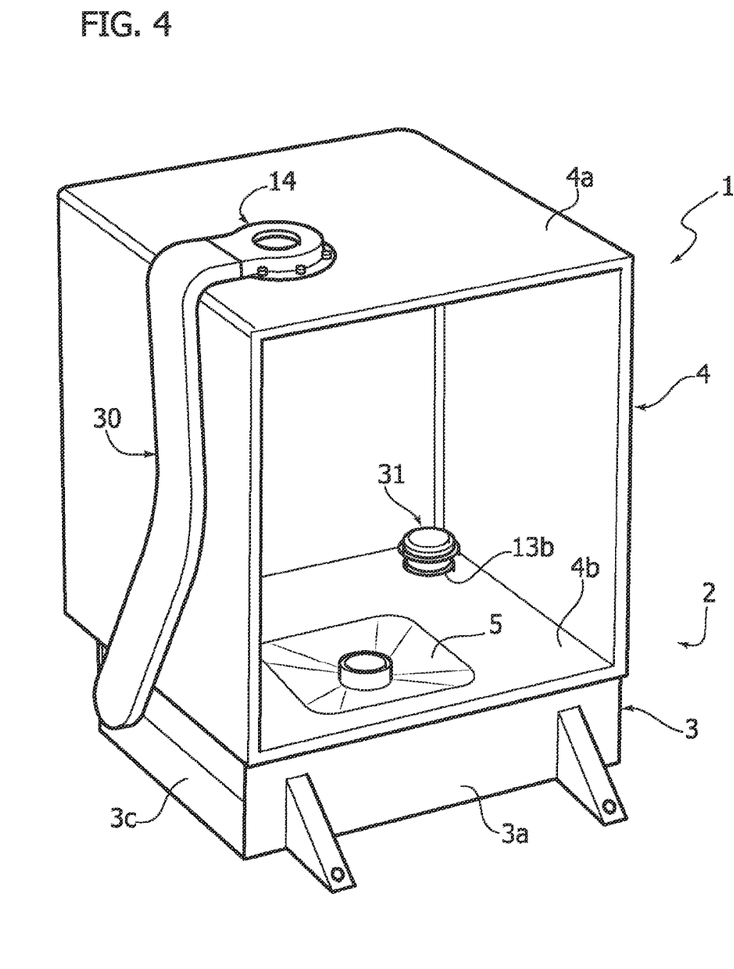
FIG. 4 is a partial and schematic perspective representation of a machine according to one embodiment of the invention.

As already mentioned, in the preferred embodiment of the invention the heat pump 20 is housed in the base 3 of the machine. In this application, the channel 13 preferentially comprises a duct, designated by 30 in FIG. 4, which extends between the base 3 and the wall of the tub 4, where the outlet opening for the drying air is defined. Represented schematically in FIG. 4 is the load-bearing structure 2 of the machine 1, with the corresponding base 3 and the tub 4 thereon. In FIG. 4, there may be seen the side walls and rear wall of the tub 4, as well as its upper wall 4*a* and its bottom wall 4*b*, to which the sump 5 is associated. In this figure, the sprinkling system S is not represented for reasons of clarity.

In one such embodiment, the bottom wall 4*b* of the tub has a tubular flue 31 associated to the inlet opening 13*b* for the hot and dehumidified drying air. This flue 31 extends through the opening 13*b* provided in the bottom wall 4*b* of the tub, preferably in a corner area thereof, with interposition of sealing means and fixing means. The flue 31 has an upper end and a lower end, which open out on opposite sides of the bottom wall 4*b*, with the upper end that is located at a height greater than the maximum level that can be reached by the water in the course of the operations of washing or rinsing carried out by the machine 1. Associated to the upper end of the flue 31 is preferably a cap or lid, which defines a substantially shielded or labyrinthine path, whereas the lower end of the flue 31 is open at a part of the channel 13 defined in the base 3, downstream of the condenser 25 (with reference to the direction of the flow of air).

In the embodiment exemplified, the duct 30 extends between one side of the base 3 and the upper wall of the tub 4, defined in which is the corresponding outlet opening for the humid air. In one embodiment, mounted at this opening is the fan 14, preferably a fan of a radial type with centrifugal impeller. In one embodiment, the fan 14 includes an open/close member operated by a corresponding actuator, for example a thermal actuator, to enable or prevent passage of humid air into the duct 30 when the fan 14 is active or inactive, respectively. A valve of this sort is useful for preventing any dispersion of heat and/or humid air during hot steps of the treatment cycle (pre-washing, washing, rinsing) that precede the drying step in order to improve the energy efficiency of the machine and prevent any condensation of humid air that may flow naturally into the duct 30.

Figure 5:
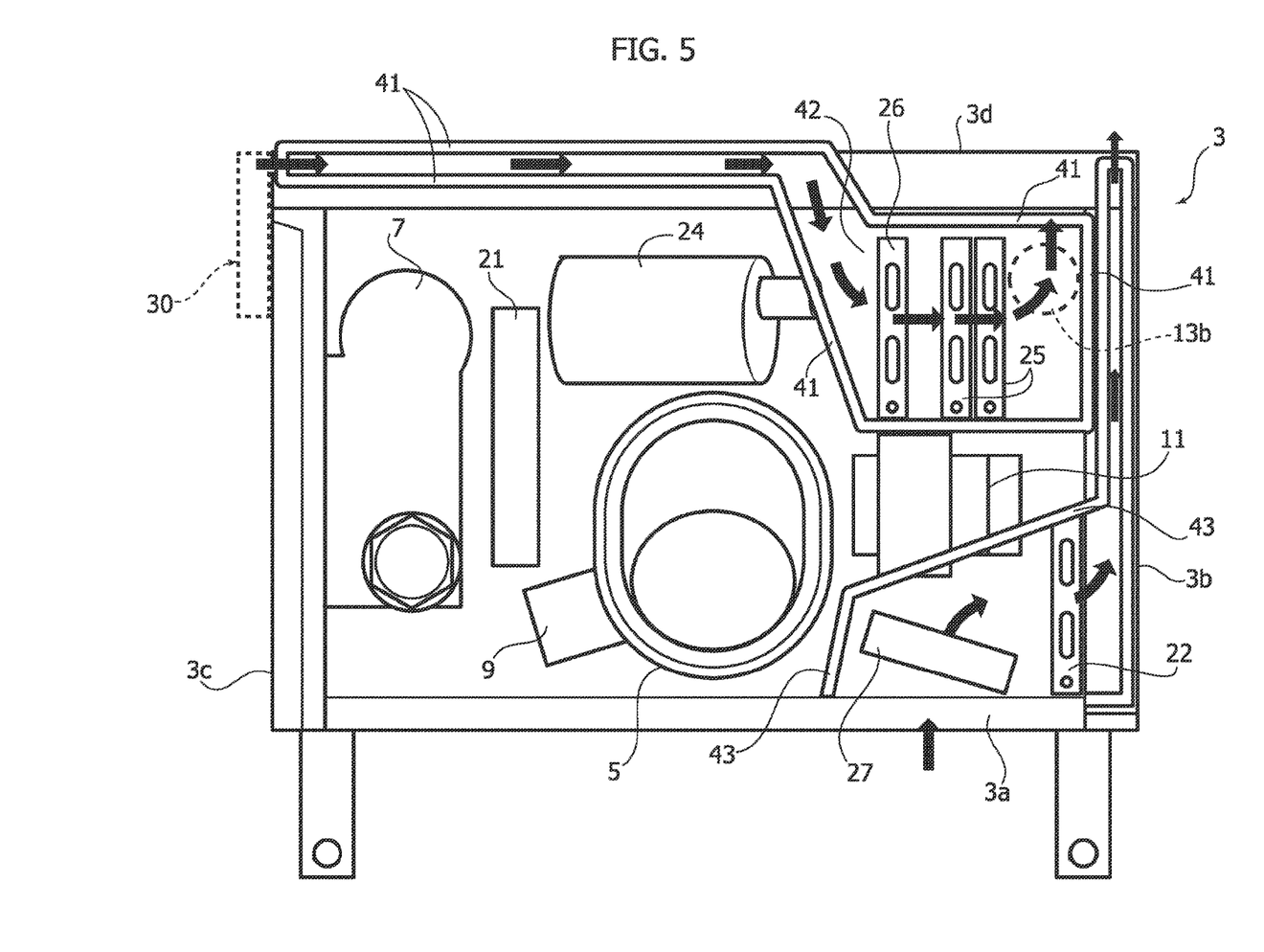
FIG. 5 is a partial and schematic representation in plan view of a base of a machine according to an advantageous embodiment of the invention.

Represented schematically in FIG. 5 is a possible embodiment of the base 3, with some of the components housed therein, amongst which the components of the heat pump 20 of FIGS. 1-2. As may be noted, preferentially, the evaporator 22 and the corresponding fan 27 are housed in a corner region of the base 3, and in particular in a region that is delimited laterally by two mutually orthogonal sides, here the front 3*a* and the right-hand side 3*b*.

Clearly visible in FIG. 5 is the sump 5, set in a substantially central position, closer to the front of the base 3, having the discharge pump 9 associated to it. The compressor 24 is preferentially set in the base 3 in a position behind the sump 5. In the embodiment currently deemed preferential, the compressor 24 is set in the base 3 in a reclined, i.e., horizontal or slightly inclined, position in order to reduce its encumbrance in height. The water-softener device 7 is instead closer to one flank of the base, here the left-hand flank 3*c*, and extending between said water-softener device 7 and the sump 5 is the condenser 21, in the direction of depth of the base 3. On the side opposite with respect to the device 7, housed in the base 3 is the washing pump 11, in a lateral position with respect to the sump 5. The fan 27 and the evaporator 22 are preferentially set in front of the pump 11, with reference to the front 3*a* of the base. The condenser 25 and the evaporator 26 extend parallel to one another in the direction of depth of the base, preferably in a position behind the pump 11 and at one side with respect to an axial end of the compressor 24. From FIG. 5 there may be clearly noted the arrangement of the condenser 25, preferably constituted by two finned-pack heat exchangers arranged in succession with respect to the flow of the drying air, i.e., with the corresponding finned packs parallel and facing one another.

Once again from FIG. 5 it may clearly be noted how, in a preferred embodiment, defined in the base 3 is a corresponding part of the channel 13 for conveying the drying air. For this purpose, in the example, the base 3 has a plurality of walls—some of which are designated by 41—which circumscribe at least laterally a space 42 in which the condenser 25 and the evaporator 26 are housed. In the example, the components 25 and 26 are in the proximity of a corner region of the base 2, defined between its flank 3b and its back 3d. A portion of the space 42 extends along the back 3d up to the opposite flank 3c of the base 3, where this portion of the space 42 is in fluid communication with the outlet of the duct 30. The space 42 is delimited at the top by the bottom wall 4b of the tub (FIG. 4), and its inlet opening 13b for the air (represented schematically dashed in FIG. 5) is defined in a position corresponding to the part of the space 42 that in FIG. 5 is downstream of the condenser 25.

In the embodiment illustrated in FIG. 5, the base moreover has one or more walls 43 that, together with the front 3a and possibly the flank 3b of the base 3, delimit the area of housing of the evaporator 22 and of the corresponding fan 27, as well as a corresponding expulsion channel, in such a way that the ambient air is drawn in through the front 3a and evacuated through the back 3d. In this embodiment, the front 3a and the back 3d and/or the aforesaid channel have respective openings (not represented) for inlet and outlet of the flow of forced air into/from the fan 27.

Figure 6:
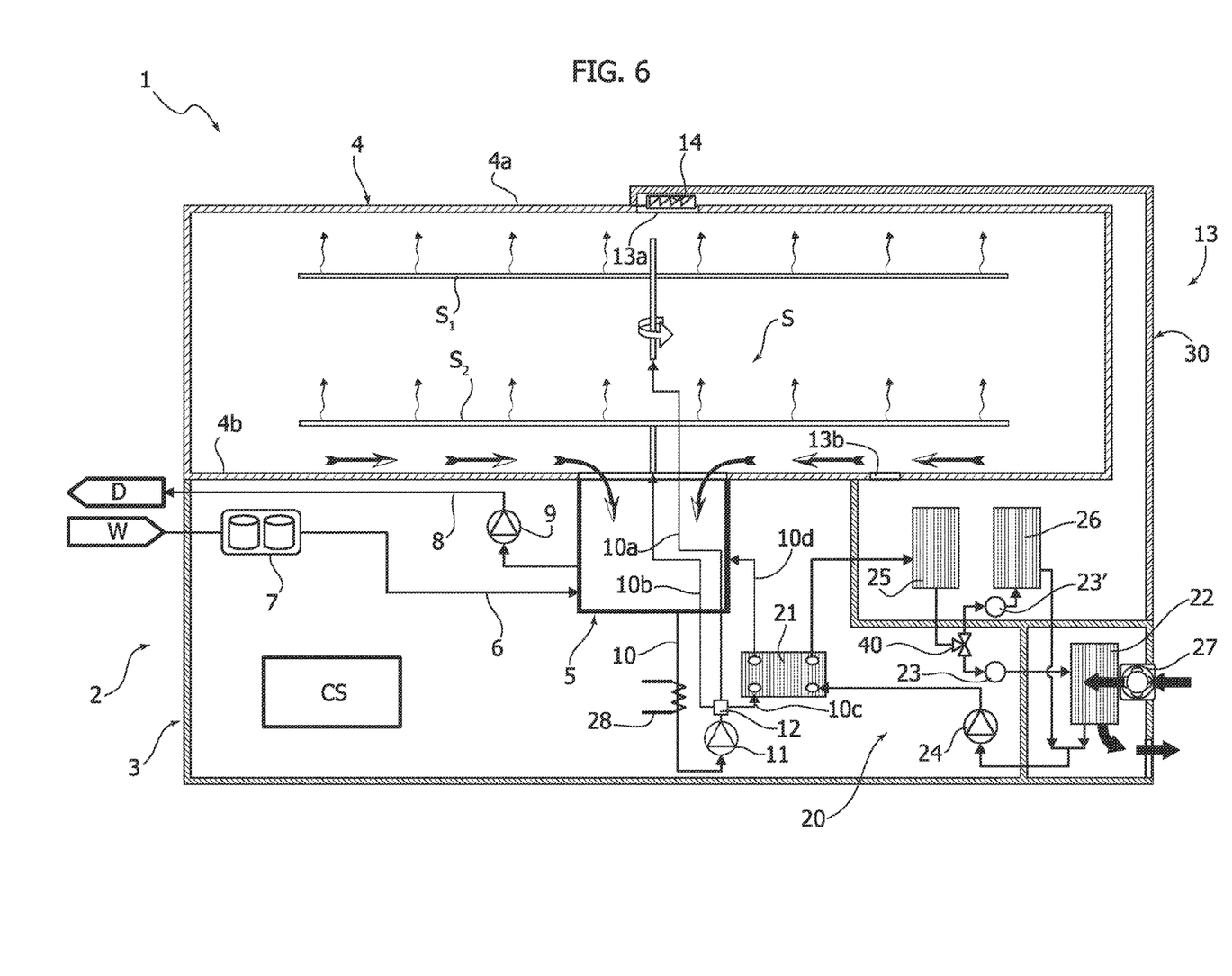
FIGS. 6 and 7 are schematic representations similar to those of FIGS. 1 and 2, which regard a further embodiment of the invention.
Figure 7:
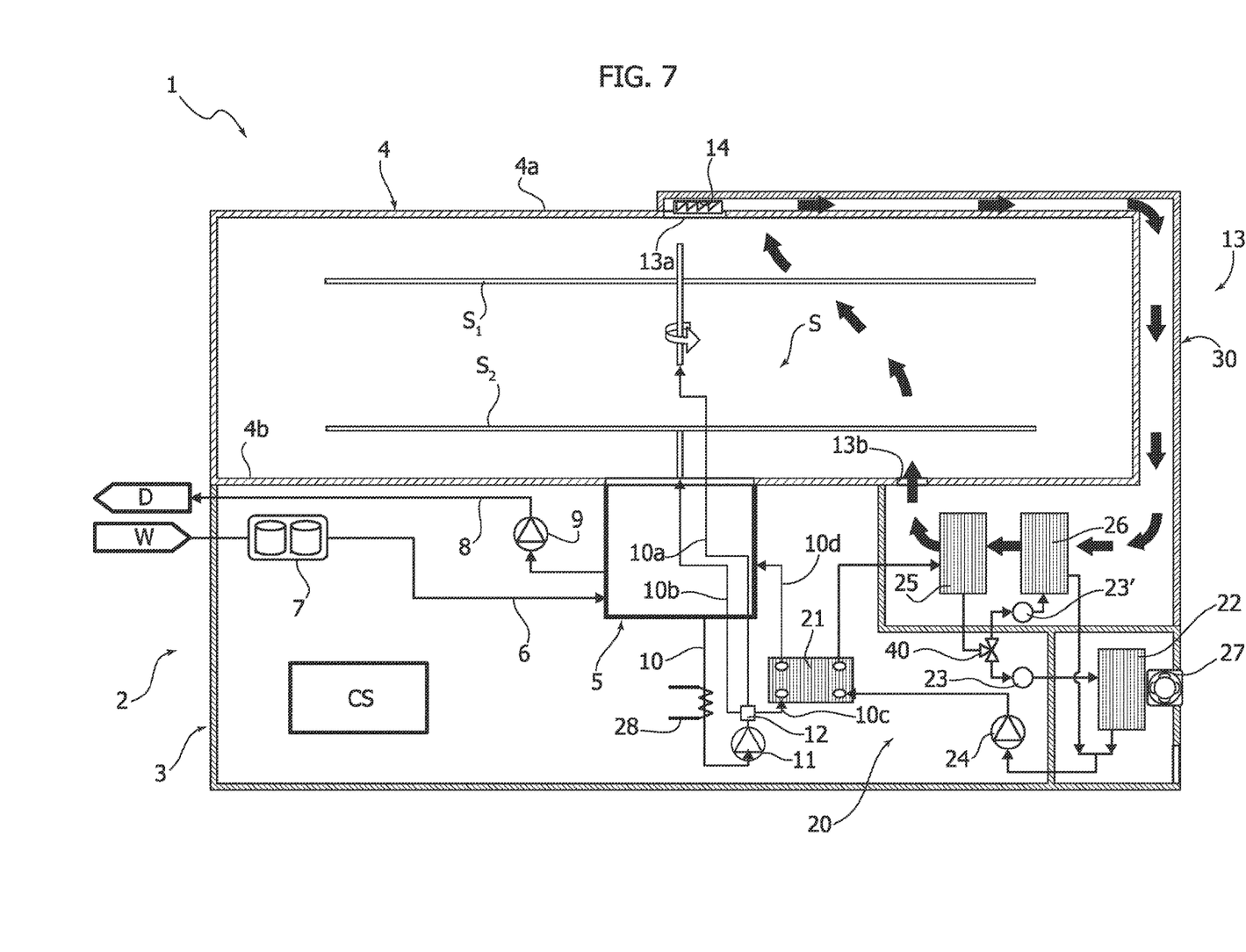

Represented in FIGS. 6 and 7 is a possible variant embodiment of the invention. In these figures, the same reference numbers as those used in the previous figures designate elements that are technically equivalent to the ones already described above.

In this embodiment, the evaporator 26 is in parallel to the evaporator 22, and the refrigerating circuit of the heat pump 20 comprises a second lamination valve 23', which for example is also constituted by a capillary tube. The lamination valve 23 is connected in the refrigerating circuit between the condenser 25 and the evaporator 22, whereas the lamination valve 23' is connected in the refrigerating circuit between the condenser 25 and the evaporator 26.

The refrigerating circuit further comprises a diverting valve, designated as a whole by 40, in particular a three-way valve, which can be controlled by the control system CS for connecting the outlet of the refrigerant fluid of the condenser 25 alternatively to the lamination valve 23 or else to the lamination valve 23'. As may be noted, moreover, the outlets of the refrigerant fluid of the evaporator 22 and of the evaporator 26 are connected in parallel to the inlet of the compressor 24, for example via a union tee possibly provided with check valves to prevent return to the inlets. The outlet of the compressor 24 is connected, as in the first embodiment, to the inlet for the refrigerant fluid of the condenser 21.

Operation of the machine 1 according to the variant embodiment of FIGS. 6 and 7 is substantially similar to what has been described with reference to FIGS. 1 and 2. In this case, in the course of a hot-washing or hot-rinsing step (FIG. 6), the control system CS renders operative a first outlet of the diverting valve 40, i.e., the outlet that is in fluid communication with the lamination valve 23 and hence with the evaporator 22. As may be appreciated, given the activation of the washing pump 11 and of the compressor 24, heating of the part of water forced by the pump 11 into the condenser 21—via the diverter 12 and the duct 10c—is obtained with the modalities already described previously. In other words, the refrigerant, compressed and heated via the compressor 24, passes into the condenser 21, thereby transferring heat to the water set in circulation by the pump 11. The refrigerant then passes through the condenser 25, which in this step is not active, given the inactive condition of the fan 14. At outlet from the condenser 25 the refrigerant is diverted by the valve 40 towards the lamination valve 23 and hence towards the evaporator 22, where the fluid absorbs heat from the flow of air generated by the fan 27. At outlet from the evaporator 22, and via the aforesaid union tee, the refrigerant can return to the inlet of the compressor 24.

When, instead, a drying step is to be carried out (FIG. 7), the control system CS renders the pump 11 and the fan 27 inoperative, activating, instead, the fan 14 and the compressor 24, as well as rendering operative the second outlet of the valve 40, i.e., the outlet that is in fluid communication with the lamination valve 23'. In this operating mode, the refrigerant, compressed and heated by means of the compressor 24, passes through the condenser 21, without substantially transferring heat, and then passes, while still hot, through the corresponding side of the condenser 25. At outlet from the condenser 25, the refrigerant passes into the second outlet of the diverting valve 40, which directs the fluid into the lamination valve 23' and then through the evaporator 26. The flow of air forced by the fan 14 first passes through the hot side of the evaporator 26 and then through the cold side of the condenser 25, thus first being dehumidified and then heated, before re-entering the tub 4, as has been described with reference to FIG. 2. The refrigerant at outlet from the evaporator 26 can then reach, via the aforesaid union tee, the inlet of the compressor 24, and then be sent back into circulation.

As may be appreciated, then, also the embodiment of FIGS. 6 and 7 enables the same functions as the embodiment of FIGS. 1-2 to be obtained as regards heating of the water and condensation and heating of the air in different steps of one and the same treatment cycle followed by the machine 1. The embodiment of FIGS. 6 and 7 introduces minimal complications as regards implementation of the refrigerating circuit owing to inclusion of the diverting valve 40 and of the second lamination valve 23', as well as of the aforementioned union tee: however, this configuration enables an increase in the overall efficiency of the heat pump 20 in so far as the part of the refrigerant circuit that is each time active is shorter (in other words, the refrigerant only has to pass through the evaporator 22 in the course of the steps of heating of the water and just through the evaporator 26 in the course of the drying steps).

From the foregoing description the characteristics of the present invention emerge clearly, as likewise do its advantages. It is evident that numerous variations may be made by the person skilled in the sector to the washing and drying machine described by way of example herein, without thereby departing from the scope of the invention as defined by the annexed claims.

The invention has been described with reference to a dish-washer machine, but it will be appreciated that the principles of the invention may be equally applied to laundry washer-dryers. Also this type of electrical household appliance usually comprises a treatment tub, rotatably mounted within which is a drum for the laundry. As for dish-washer machines, also washer-dryers are provided with a drying circuit comprising at least one fan, means for condensation of the humidity present in the air extracted from the tub and means for heating the dehumidified air before it is conveyed back into the tub. Some washer-dryers are also provided with water-recirculation arrangements, aimed precisely at obtaining a circulation of the treatment liquid from the bottom of the tub (not necessarily provided with a sump) to a part generally overlying the washing drum, or else to a nozzle that directs the flow of water directly into the drum through a front opening thereof. Also in the case of a machine for washing and drying laundry, the heat-pump arrangement described can be conveniently housed in the base of the machine.

In the embodiments previously described the inlet 13b for the drying air is defined in the bottom wall 4b of the tub 4. However, as already mentioned, in possible variant embodiments this inlet could be provided in a side wall of the tub 4. In such an embodiment, downstream of the condenser 25 (with reference to the direction of the flow of air) there will conveniently be provided a stretch of the channel 13 for conveying the dehumidified and heated air from the base as far as the aforesaid inlet provided in the side wall of the tub.

According to some embodiments, not represented, the part of liquid subjected to heating by the heat pump 20 can be tapped via a simple branching duct between the delivery line of the pump 11 and the inlet of the cold side of the condenser 21. Such an application may, for example, be used in the case of machines not provided with valve means like the ones previously designated by 12.

In further variant embodiments, the functions of the valve means 12 can be obtained via a plurality of electrically controlled valves, instead of by a single switchable device.

The invention claimed is:

1. A machine for washing and drying, having a treatment tub to contain items to be washed and dried, wherein the machine comprises:
    a washing circuit, for drawing a washing liquid from the tub and conveying it back into the tub, the washing circuit having a pump and means for heating the washing liquid;
    a drying circuit, for forcedly drawing air from the tub and conveying it back into the tub, the drying circuit having a first fan, means for dehumidifying the air extracted from the tub and means for heating the dehumidified air to be conveyed back into the tub;
    a heat pump arrangement having a refrigerating circuit for a refrigerant fluid, which includes a first condenser, a first evaporator, a first lamination valve and a compressor, the means for heating the washing liquid comprising the first condenser; and
    a control system, including a control unit, prearranged for controlling execution of a plurality of treatment programs that can be carried out by the machine;
    wherein the refrigerating circuit of the heat pump arrangement further comprises a second condenser in series to the first condenser and a second evaporator, in that the means for dehumidifying the air extracted from the tub comprises the second evaporator and in that the means for heating the air dehumidified to be conveyed back into the tub comprises the second condenser.

2. The machine according to claim 1, wherein:
    the second evaporator is in series to the first evaporator and operatively arranged in the refrigerating circuit between the second condenser and the first evaporator;
    the first lamination valve is operatively arranged in the refrigerating circuit between the second condenser and the second evaporator; and
    the compressor is operatively arranged in the refrigerating circuit between the first evaporator and the first condenser.

3. The machine according to claim 1, wherein:
    the second evaporator is in parallel to the first evaporator;
    the refrigerating circuit of the heat pump arrangement comprises a second lamination valve;
    the first lamination valve is operatively arranged in the refrigerating circuit between the second condenser and the first evaporator and the second lamination valve is operatively arranged in the refrigerating circuit between the second condenser and the second evaporator;
    the refrigerating circuit of the heat pump arrangement further comprises a diverting valve, controllable by the control system to alternatively connect an outlet for the refrigerant fluid of the second condenser to the first lamination valve or else to the second lamination valve; and
    an outlets for the refrigerant fluid of the first evaporator and of the second evaporator are connected in parallel to an inlet of the compressor, whose outlet is connected to an inlet for the refrigerant fluid of the first condenser.

4. The machine according to claim 3, further comprising a second fan for forcing an airflow through the first evaporator, wherein the control system is prearranged to render active the second fan in a course of at least one hot washing step or hot rinsing step of a first treatment program and to keep the second fan inactive in a course of at least a drying step of the first treatment program, with the control system being also configured to render active the first fan in the course of said drying step and to keep the first fan inactive in the course of said hot washing step or hot rinsing step.

5. The machine according to claim 4, wherein the control system is prearranged to:
    render a first outlet of the diverting valve operative in the course of said hot washing step or hot rinsing step, the first outlet being in fluid communication with the first lamination valve; and
    render a second outlet of the diverting valve operative in the course of said drying step, the second outlet being in fluid communication with the second lamination valve.

6. The machine according to claim 5, wherein the pump of the washing circuit is a washing pump and wherein the control system is configured to render the washing pump active in the course of said hot washing step or hot rinsing step and to keep the washing pump inactive in the course of said drying step.

7. The machine according to claim 6, wherein:
    the washing circuit comprises a lower sump of the tub for collecting the washing liquid;
    the lower sump has an outlet which is in fluid communication with an intake side of the washing pump; and
    a sprinkling system operative in the inside of the tub and a section of passage of the washing liquid of the first condenser are in fluid communication with a delivery side of the washing pump.

8. The machine according to claim 7, wherein:
    the washing circuit comprises a switchable valve device operatively arranged downstream of the delivery side of the washing pump for the control of a supply of the washing liquid to the sprinkling system;

the sprinkling system includes at least one first sprinkler, one second sprinkler, one first supply duct for the first sprinkler and one second supply duct for the second sprinkler;

the switchable valve device comprises a housing having an inlet, connected with the delivery side of the washing pump, a first outlet connected to the first supply duct and a second outlet connected to the second supply duct, within the housing there being mounted displaceable a distributor member, designed to be driven by an actuator to assume a plurality of operative positions, among which at least a position of opening of one between the first outlet and the second outlet and contemporaneous closing of the other one of the first outlet and the second outlet;

the housing of the switchable valve device has a third outlet which is always open, such that it is open irrespective of the operative position assumed by the distributor member and which is connected through a third duct to an inlet of the section of passage of the washing liquid of the first condenser; and an outlet of the section of passage of the washing liquid of the first condenser is in fluid communication with the lower sump through a fourth duct.

9. The machine according to claim 8, wherein between the third outlet of the housing of the switchable valve device and the inlet of the section of passage of the washing liquid in the first condenser are valve means, controllable in an independent way with respect to the switchable device.

10. The machine according to claim 1, wherein the means for heating the washing liquid comprise an auxiliary electrical heater, operative upstream of the first condenser.

11. The machine according to claim 1, wherein:
the first condenser is a plate heat exchanger; or
the first evaporator and the second evaporator comprises at least one respective finned heat exchanger, the second condenser comprising two finned-pack heat exchangers in series to each other.

12. The machine according to claim 1, wherein the first fan is mounted substantially at an air outlet opening of the tub, the air outlet opening being defined in an upper wall of the tub.

13. The machine according to claim 1, wherein the heat pump arrangement is housed in a base of the machine.

14. The machine according to claim 13, wherein the drying circuit comprises a duct which extends between the base and a wall of the tub wherein an air outlet opening is defined.

15. A method for controlling operation of a machine according claim 1, wherein:
in a course of at least one hot washing step or hot rinsing step of a treatment program, the first fan is kept inactive, a second fan is rendered active and the washing pump is rendered active; and
in a course of at least one drying step of the treatment program, the first fan is rendered active, the second fan is kept inactive and the washing pump is kept inactive.

16. The machine according to claim 1, further comprising a second fan for forcing an airflow through the first evaporator, wherein the control system is prearranged to render active the second fan in a course of at least one hot washing step or hot rinsing step of a first treatment program and to keep the second fan inactive in a course of at least a drying step of the first treatment program, with the control system being also configured to render active the first fan in the course of said drying step and to keep the first fan inactive in the course of said hot washing step or hot rinsing step.

17. The machine according to claim 1, wherein the washing circuit further includes a lower sump of the tub for collecting the washing liquid, with the lower sump having an outlet which is in fluid communication with an intake side of the pump, and a sprinkling system operative in the inside of the tub and the first condenser is in fluid communication with a delivery side of the pump.

* * * * *